(12) United States Patent
Marcaly

(10) Patent No.: US 11,081,763 B2
(45) Date of Patent: Aug. 3, 2021

(54) CURRENT INTERRUPT FOR ELECTROCHEMICAL CELLS

(71) Applicant: Energizer Brands, LLC, St. Louis, MO (US)

(72) Inventor: Frederick Whitestone Marcaly, Amherst, OH (US)

(73) Assignee: Energizer Brands, LLC, St. Louis, MO (US)

( * ) Notice: Subject to any disclaimer, the term of this patent is extended or adjusted under 35 U.S.C. 154(b) by 120 days.

(21) Appl. No.: 16/413,308

(22) Filed: May 15, 2019

(65) Prior Publication Data

US 2020/0365870 A1 Nov. 19, 2020

(51) Int. Cl.
 *H01M 50/572* (2021.01)
 *H01M 6/04* (2006.01)
 *H01M 50/531* (2021.01)

(52) U.S. Cl.
 CPC ......... *H01M 50/572* (2021.01); *H01M 6/045* (2013.01); *H01M 50/531* (2021.01)

(58) Field of Classification Search
 CPC .......... H01M 2/34; H01M 2/26; H01M 6/045; H01M 50/572; H01M 50/531
 See application file for complete search history.

(56) References Cited

U.S. PATENT DOCUMENTS

| 5,415,948 | A | 5/1995 | Gauthier et al. | |
|---|---|---|---|---|
| 7,763,375 | B2 | 7/2010 | Igoris et al. | |
| 8,617,259 | B2 | 12/2013 | Marple | |
| 2008/0026286 | A1* | 1/2008 | Cui | H01M 4/667 429/161 |
| 2013/0065096 | A1* | 3/2013 | Daniel-Ivad | H01M 10/24 429/56 |

FOREIGN PATENT DOCUMENTS

CN 207097950 U 3/2018

OTHER PUBLICATIONS

International Searching Authority, International Search Report and Written Opinion received for Application No. PCT/US2020/032873, dated Aug. 10, 2020, 10 pages, European Patent Office, Netherlands.

\* cited by examiner

*Primary Examiner* — Olatunji A Godo
(74) *Attorney, Agent, or Firm* — Alston & Bird LLP

(57) ABSTRACT

To counteract the potentially destructive effects of temperature increases in primary batteries during short circuit conditions, a current interrupt may be positioned within an anode conductive path. The current interrupt may comprise a thermoplastic substrate having a low glass transition temperature, and having a conductive coating thereon to form a portion of the anode conductive path. During a short circuit, the temperature within the battery increases above the glass transition temperature of the thermoplastic substrate, thereby causing the current interrupt to deform, thereby degrading the portion of the anode conductive path defined by the current interrupt, decreasing the amount of current flowing through the anode conductive path, and effectively limiting the temperature increase within the battery interior.

17 Claims, 3 Drawing Sheets

CURRENT INTERRUPT FOR ELECTROCHEMICAL CELLS

BACKGROUND

Direct shorting of primary electrochemical batteries with higher capacity causes increasing internal cell temperatures which can cause expansion of an included electrolyte, thereby leading to hydraulic pressurization and potential sudden dis-assembly. Accordingly, a need exists to mitigate or prevent sudden temperature increases in batteries when shorted across the positive and negative terminals with a very low external resistance.

BRIEF SUMMARY

Certain embodiments are directed to current interrupt assemblies for inclusion within electrochemical cells, such as primary, alkaline electrochemical batteries having a bobbin-style construction. In certain embodiments, the current interrupt assembly is included within an anode conducting assembly. In certain embodiments, the current interrupt assembly may be positioned electrically between the anode current collector and the negative cover of the battery container. In such embodiments, the current interrupt assembly may comprise a thermoplastic component (e.g., a thermoplastic pad) having a conductive plating thereon (e.g., copper, tin, and/or the like), which provides an electrically conductive path between the anode current collector and the negative cover. In other embodiments, the anode current collector may comprise a thermoplastic material having a conductive plating in electrical contact with the negative cover of the battery. In such embodiments, the anode current conductor embodies the current interrupt assembly.

To decrease potential damage caused by internal battery temperature increases during a short-circuit scenario, the thermoplastic of the current interrupt assembly has a glass transition temperature well-below the temperature at which the battery is at risk of sudden disassembly. Thus, when the temperature of the current interrupt assembly reaches the glass transition temperature of the thermoplastic material (e.g., as a result of resistive heating), the thermoplastic material deforms (and with it the conductive plating deforms) to decrease the quality of electrical connection along the anode conductive assembly (extending between the anode current collector and the negative cover of the battery), thereby decreasing the amount of current capable of passing through the anode conductive assembly and preventing further temperature increases within the battery.

Various embodiments are directed to an electrochemical cell comprising: a container having a positive terminal and a negative terminal cover; a ring-shaped cathode positioned within the container and defining a hollow interior, wherein the cathode is in electrical connection with the positive terminal; an anode positioned within the hollow interior of the cathode, wherein the anode is in electrical connection with the negative cover via an anode conducting assembly comprising a current interrupt assembly comprising a thermoplastic component plated with a conductor; and a separator positioned between the cathode and the anode.

In certain embodiments, the anode conducting assembly comprises: an anode current collector; and the current interrupt assembly electrically connects the anode current collector with the negative cover. In various embodiments, the current interrupt assembly is defined as a thermoplastic pad having a conductive plating positioned between the anode current collector and the negative cover. Moreover, the conductive plating may have a thickness between about 1.5 microns and about 10 microns.

In certain embodiments, the current interrupt assembly is defined as an anode current collector in electrical connection with the negative terminal cover. Moreover, the anode current collector may be defined as a thermoplastic nail extending into an interior of the anode and having a conductive plating layer. In certain embodiments, the conductive plating layer has a thickness between about 1.5 microns and about 10 microns. Moreover, the thermoplastic nail may have a diameter of between about 0.9 mm and about 1.8 mm.

In certain embodiments, the thermoplastic material has a glass transition temperature of less than 150° C. In various embodiments, the thermoplastic material is an ABS plastic. According to certain embodiments, the conductive plating layer comprises at least one of: copper or tin.

Certain embodiments are directed to a conducting assembly for an electrochemical cell, wherein the conducting assembly is configured for conducting current along a conductive path from an electrode to a terminal of the electrochemical cell. In various embodiments, the conducting assembly comprises: a current interrupt configured for conducting current along at least a portion of the conducting assembly, wherein the current interrupt comprises: a thermoplastic substrate; and a conductive plating layer on an exterior surface of the thermoplastic substrate, wherein the conductive plating layer defines at least a portion of the conductive path.

In various embodiments, the conducting assembly further comprises a current collector; and wherein the current interrupt is electrically positioned between the current collector and the terminal. In certain embodiments, the current interrupt assembly is defined as a thermoplastic pad having a conductive plating positioned between the current collector and the terminal. In various embodiments, the current interrupt is defined as a current collector in electrical connection with the terminal. Moreover, the current interrupt may be defined as an anode current collector comprising: a thermoplastic nail extending into an interior of an anode of an electrochemical cell; and a conductive plating layer disposed on an exterior surface of the thermoplastic nail. In certain embodiments, the thermoplastic substrate comprises an ABS plastic. Moreover, in various embodiments, the conductive plating layer comprises at least one of copper or tin.

Various embodiments are directed to a method of manufacturing a primary electrochemical battery. In certain embodiments, the method comprises: providing a battery container having a positive terminal and a negative terminal cover; disposing a cathode within the container, wherein the cathode is in electrical connection with the positive terminal, and wherein the cathode defines a hollow interior; disposing a separator along an interior wall of the hollow interior of the cathode; filling the hollow interior of the cathode with an anode; positioning an anode conducting assembly electrically between the anode and the negative cover, wherein the anode conductive assembly comprises a current interrupt assembly comprising a thermoplastic component plated with a conductor.

In various embodiments, positioning the anode conducting assembly electrically between the anode and the negative cover comprises: positioning an anode current conductor within the anode; electrically connecting the anode current conductor with the negative cover. Moreover, electrically connecting the anode current conductor with the negative cover may comprise electrically connecting the anode current conductor with the negative cover via the current interrupt assembly. In certain embodiments, the anode current conductor comprises the current interrupt.

In various embodiments, positioning the anode current conductor within the anode comprises positioning a thermoplastic nail having a conductive plating within the anode. Moreover, the method may further comprise forming the current interrupt assembly by: providing a thermoplastic substrate; and plating the thermoplastic substrate with a conductor. In certain embodiments, the conductor comprises one of: copper or tin. Moreover, the method may further comprise forming the current interrupt assembly by: providing a thermoplastic nail; and plating the thermoplastic nail with a conductor.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Alkaline electrochemical cells are commercially available in cell sizes commonly known as LR6 (AA), LR03 (AAA), LR14 (C) and LR20 (D). The cells have a cylindrical shape that complies with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain. Due to the increased use of high drain devices, such as digital cameras, it is desirable for a manufacturer to produce a battery that possesses desirable high drain discharge properties.

Figure 1:
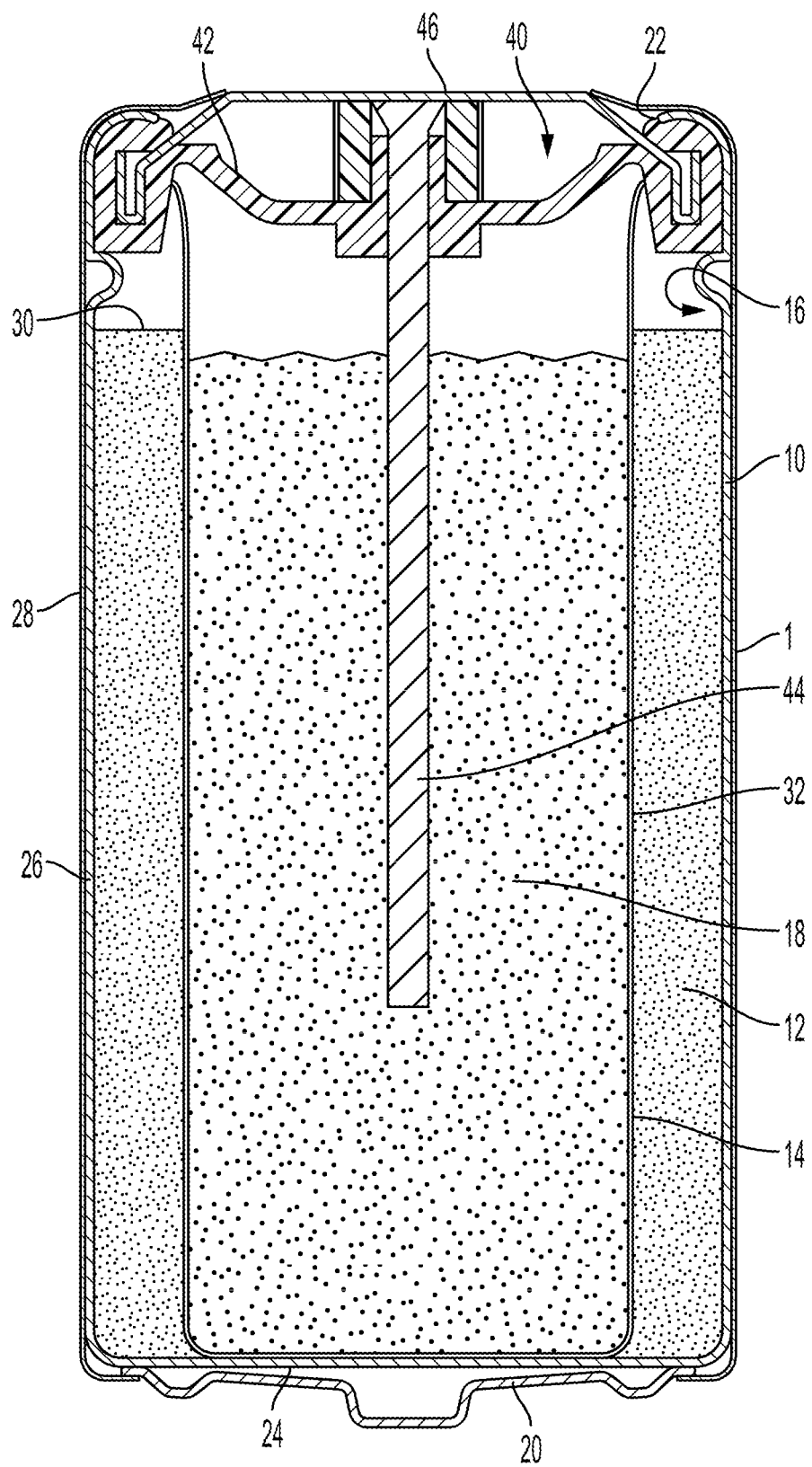
FIG. 1 is a cross-sectional elevational view of an alkaline electrochemical cell according to one embodiment.

FIG. 1 shows a cylindrical cell 1 in elevational cross-section, with the cell having a nail-type or bobbin-type construction and dimensions comparable to a conventional LR6 (AA) size alkaline cell. However, it is to be understood that cells according to various embodiments can have other sizes and shapes, such as a prismatic or button-type shape; and electrode configurations, as known in the art. The materials and designs for the components of the electrochemical cell illustrated in FIG. 1 are for the purposes of illustration, and other materials and designs may be substituted.

The electrochemical cell 1 includes a container or can 10 having a closed bottom end 24, a top end 22, and sidewall 26 therebetween. The closed bottom end 24 includes a terminal cover 20 including a protrusion. In certain embodiments, the terminal cover 20 may be integrally formed with the closed bottom end 24 of the container. In other embodiments, the terminal cover 20 may be secured onto a flat closed bottom end of the container 10. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, which may be plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46 (positioned within an open end of the container 10), so long as the negative terminal cover 46 is electrically insulated from container 10 and positive terminal 20.

Disposed within the container 10 are a first electrode 18 (anode) and second electrode 12 (cathode) with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed. Moreover, closure assembly 40 comprises a negative conductive assembly for connecting the first electrode 18 (anode) with the negative terminal cover 46 of the container 10.

Closure assembly 40 comprises a closure member 42 such as a gasket, an anode current collector 44 (e.g., a nail-type anode current collector 44) and conductive negative terminal cover 46 in electrical contact with the anode current collector 44. Closure member 42 may contain a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly (phenylene oxide) or polystyrene, or another material, such as a metal, provided that the current collector 44 and conductive negative terminal cover 46 are electrically insulated from container 10 which serves as the current collector for the second electrode 12. In the embodiment illustrated, current collector 44 is an elongated nail or bobbin-shaped component. In certain embodiments, the current collector 44 is made of metal or metal alloys, such as copper or brass, conductively plated metallic or plastic collectors or the like. Other suitable materials can be utilized. Current collector 44 is inserted through a hole (e.g., a centrally located hole) in closure member 42.

Figure 2:
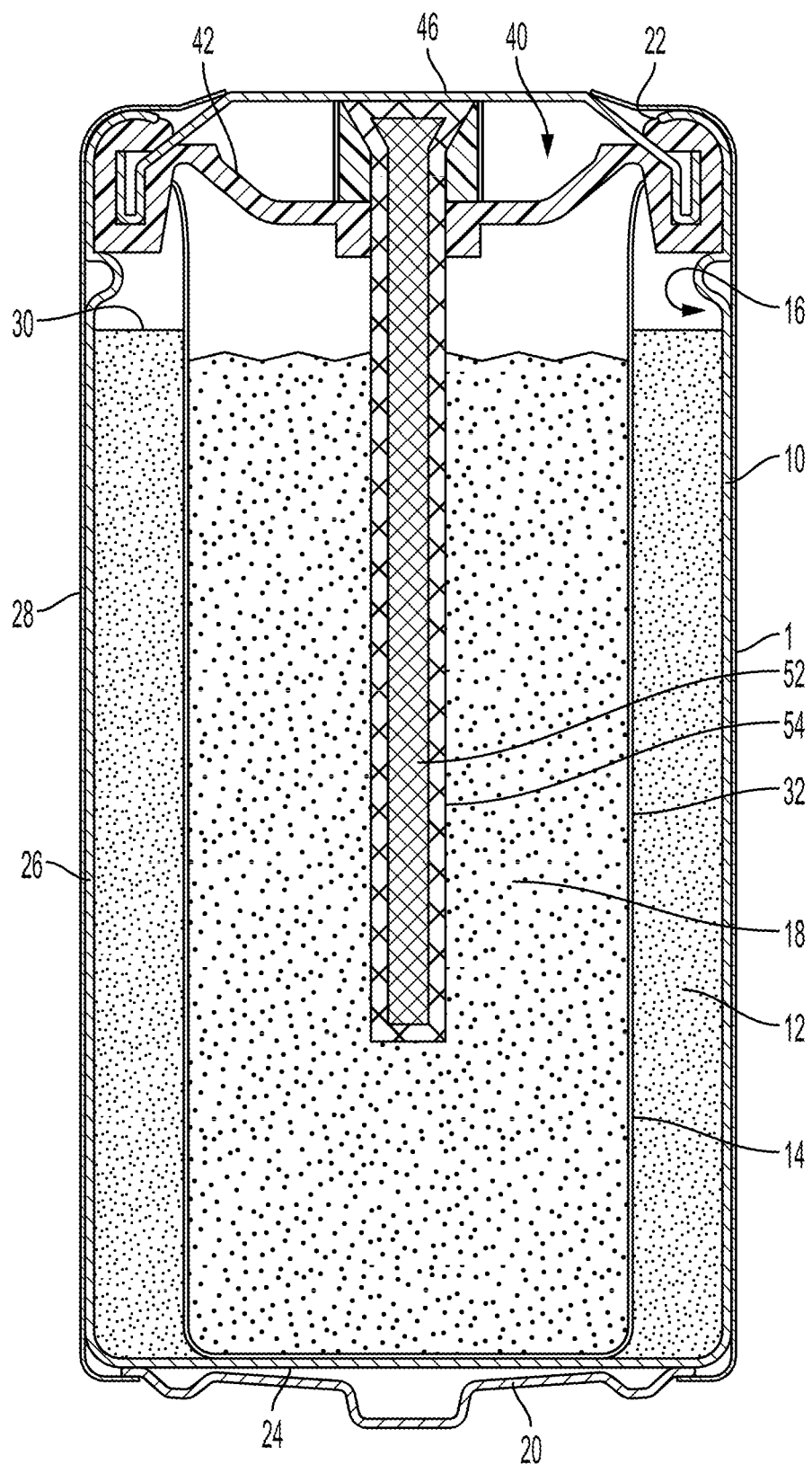
FIG. 2 is a close-up cross-sectional view of a portion of an anode conductor assembly according to one embodiment.

The current collector 44 of certain embodiments may define a current interrupt for the battery, as shown in the embodiment of FIG. 2. In such embodiments, the current collector 44 may define an elongated thermoplastic substrate 52 (e.g., Acrylonitrile butadiene styrene (ABS) thermoplastic, nylons, acetals or any rigid plastics that are responsive to plating) that may be formed via any of a variety of manufacturing methods (e.g., molding (e.g., injection molding), milling, and/or the like). In certain embodiments, the elongated thermoplastic substrate 52 may have an elongated nail shape. For example, the elongated thermoplastic substrate 52 may have an enlarged first end (e.g., having a first diameter) and an elongated second end extending from the first end to a distal end (e.g., having a second diameter smaller than the first diameter). In certain embodiments, the first end may be located at or proximate to the negative terminal cover 24, and may have a cylindrical or cone-shape (as shown in FIG. 2). The second end may have a generally uniform diameter and a generally cylindrical shape extending between the first end and the distal end. The elongated thermoplastic nail 52 may be plated with a conductor layer 54, such as tin, copper, indium, brass, zinc, silver or other conductive materials. The conductor layer 54 may be provided onto an exterior surface of the thermoplastic nail 52 via any of a variety of plating methods, such as wet plating including electroless plating or electroplating via bath immersion and displacement, vacuum deposition equipment, sputter-coating, dip-coating, spray-coating, or dry plating such as Physical Vapor Deposition (PVD) or plasma, and/or the like. In certain embodiments, the thermoplastic substrate 52 may have a circular cross-section, although any of a variety of cross-sectional shapes (e.g., square, triangular, hexagonal, and/or the like) may be utilized. In certain embodiments, the thermoplastic substrate 52 may have a cross-sectional diameter of between about 0.036" to 0.072" (0.9 mm to 1.8 mm), diameters that are common for nails used in cell sizes from 4A to D. The thermoplastic substrate 52 may be solid, or may define or more hollow portions (e.g., a single hollow portion extending along at least a portion of a length of the substrate, or a plurality of hollow voids spaced along the length of the substrate). In various embodiments, the thermoplastic nail may have a glass transition temperature less than 150° C. As a specific example, an ABS plastic thermoplastic nail may have a glass transition temperature of at least about 105° C. Having a relatively lower glass transition temperature (e.g., below 150° C.), the thermoplastic substrate 52 deforms as the internal temperature of the battery increases (e.g., during a short-circuit condition), causing similar deformations in the conductive plating layer 54 of the current collector 44. These deformations decrease electrical conductivity of the current collector 44, effectively lowering the current flowing along the current collector 44 and minimizing temperature increases of the battery.

As mentioned, the thermoplastic substrate 52 may be plated with a conductive material layer 54, such as tin or copper (although any of a variety of other conductive materials may be utilized. In certain embodiments, the conductive material layer 54 may be plated onto the surface of the thermoplastic nail at a thickness from 1.5 microns to 10 microns. The plating may be performed in a single plating step, or a plurality of plating steps. In certain embodiments, the entirety of the outer surface of the thermoplastic nail may be plated with the conductive material. However, in other embodiments, only a portion of the outer surface of the thermoplastic nail may be plated with the conductive material. In the latter embodiment, conductive channels may be plated onto the surface of the thermoplastic nail, extending along the length of the thermoplastic nail.

Conductive media and/or adhesive which is proximal to the negative terminal cover 46 and a first end of the current collector 44 may be used to electrically secure the current collector 44 with the negative terminal cover 46. The connection between the current collector 44 and the negative terminal cover 46 may be a pressure contact and a conductive media. In other embodiments, the current collector 44 may be secured with the negative terminal cover 46 via a pressure contact alone, with a surface of the plated current collector 44 in contact with the negative terminal cover 46 to establish electrical communication between the current collector 44 and the negative terminal cover 46. In other embodiments, the current collector 44 may be secured with the negative terminal cover 46 via a snap or other fastening mechanism. The distal end of the current collector 44 is immersed in or proximal to the first electrode (anode) 18 and in electrical communication with the first electrode 18 so as to be able to transfer electrical current from the first electrode 18 to the negative terminal cover 46 of the battery. As charge from the cell is gathered by the current collector 44, the current is transported along the conductive plating layer 54 on the thermoplastic substrate 52. The current path in the conductive plating layer 54 over thermoplastic substrate 52 has a much smaller volumetric path over which current flows as compared to a solid conductive current collector nail. The restriction in current path creates an area of Joule heating (also known as resistive or Ohmic heating). During a short-circuit scenario, the increasing heat from high current passing through the plating layer 54 causes adequate heat for the thermoplastic substrate 52 in the current interrupt device to increase beyond the glass transition of the thermoplastic substrate 52, causing deformation of the current interrupt device and the associated current-carrying conductive plating layer 54. It is further believed the current may be reduced during high-heat circumstances generated during a short-circuit scenario through degradation of the conductive plating layer 54 due to the Joule heating effect. As the plating layer 54 degrades, the current capacity of the conductive plating layer 54 is believed to be reduced. In case as the current collector 44 and/or plating layer 54 deform, the current carrying ability of the current collector 44 is reduced, and therefore the current output of the battery is throttled and the temperature increase of the electrolyte in the cell and the plating layer 54 on the current interrupt is stopped or significantly reduced. Thereafter, the current interrupt remains in the deformed state, leaving the current carrying ability of the current collector 44 at a reduced level.

Figure 3:
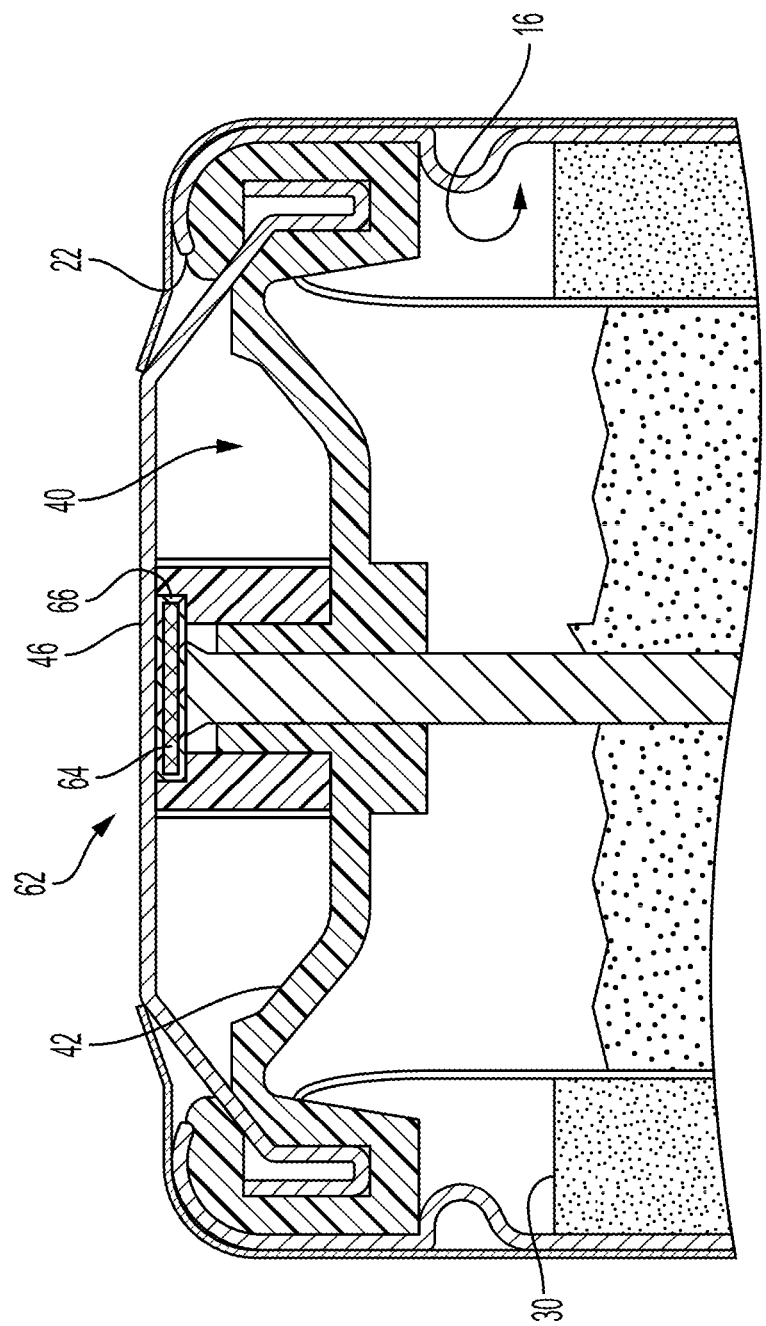
FIG. 3 is a close-up cross-sectional view of a portion of an anode conductor assembly according to another embodiment.

In other embodiments, such as that shown in FIG. 3, the anode current conductor assembly may comprise a current interrupt 62 positioned electrically between a current collector 44 (e.g., a solid conductive current collector or a current collector configured as described in reference to FIG. 2, above) and negative terminal cover 46. As shown in FIG. 3, the current interrupt 62 may comprise a thermoplastic substrate 64 similar to that discussed in reference to FIG. 2. In the illustrated embodiment of FIG. 3, the thermoplastic substrate 64 have a thin-disk (e.g., a circular disk) shape corresponding to the diameter of the nail used within the cell (it should be understood that the diameter of the cell may differ within different cell sizes).

However, other shapes may be utilized. Moreover, the thermoplastic substrate 64 may be formed via any of a variety of manufacturing methods (e.g., molding (e.g., injection molding), milling, sheet punching, and/or the like).

Specifically, the thermoplastic substrate 64 may have a glass transition temperature less than 150° C. As a specific example, an ABS plastic thermoplastic substrate 64 may have a glass transition temperature of at least about 105° C. Having a relatively lower glass transition temperature (e.g., below 150° C.), the thermoplastic substrate 64 deforms as the internal temperature of the battery increases (e.g., during a short-circuit condition), causing similar deformations in the conductive plating layer 66 of the current interrupt 62. The current interrupt 62 may be plated with a conductive plating layer 66 at a thickness of less than or approximately equal to 10 microns (e.g., between about 1.5 microns and about 10 microns). The plating may be performed via any of a variety of plating methodologies as discussed above in reference to FIG. 2, and may be performed in a single plating step or a plurality of plating steps. In certain embodiments, the entirety of the outer surface of the current interrupt 62 may be plated with the conductive plating layer 66. However, it should be understood that in certain embodiments, a portion of the outer surface of the current interrupt 62 may be plated with the conductive material layer 66.

As shown in FIG. 3, the current interrupt can be attached to the negative terminal cover 46 on a first side of the current interrupt with a conductive media and/or adhesive which is proximal to the negative cover. The opposite, second side of the current interrupt 62 may be attached to the current collector 44 with a conductive media and/or adhesive. However it should be understood that both sides of the current interrupt 62 may be secured (to the negative terminal cover 46 and current collector 44, respectively) via a pressure contact and a conductive media, via a pressure contact alone with the plated surface touching the current collector 44 on the second side of the current interrupt 62 and the negative terminal cover 46 on the opposite first side of the current interrupt, or via a snap or other fastener mechanism.

According to the embodiment of FIG. 3, as charge from the cell is gathered by the current collector 44, it is passed to the current interrupt 62. Current flows through the conductive plating layer 66 on the current interrupt 62 and is passed to the negative terminal cover 46. During a short circuit, high current through the negative conductor assembly is created by the battery. The high current increases the temperature of the electrolyte in the cell and increases the temperature of the plating layer 66 on the current interrupt 62. The plating layer 66 on the current interrupt 62 constitutes a much smaller current path than the current path present in direct electrical connections between a solid current collector 44 and negative terminal cover 46 (without the current interrupt 62 positioned therebetween). The restriction in current path creates an area of Joule heating (also known as resistive or Ohmic heating). Over time the increasing heat from high current passing through the plating layer 66 causes adequate heat for the thermoplastic substrate 64 in the current interrupt 62 to exceed the glass transition temperature of the thermoplastic substrate 64, thereby allowing deformation of the current interrupt 62 and the associated current carrying plating layer 66. Another mechanism by which the current may be reduced is by the plating layer 66 degrading due to the Joule heating effect. As the plating layer 66 degrades, current capacity is reduced. As the current interrupt 62 and/or plating layer 66 deform, the current carrying ability of the current interrupt 62 is reduced, and the current output of the battery is throttled and the temperature increase of the electrolyte in the cell and the plating layer 66 on the current interrupt device is stopped or significantly reduced. The current interrupt 62 remains in the deformed state, leaving the current carrying ability of the current interrupt 62 at a reduced level.

As discussed herein, current interrupts according to various embodiments may be incorporated into bobbin-type, primary alkaline electrochemical cells having a configuration as discussed herein. However, it should be understood that current interrupts according to various embodiments may be utilized with any of a variety of battery types (e.g., secondary batteries, jellyroll style batteries, and/or the like).

In the illustrated embodiment, first electrode 18 may be a negative electrode or anode. The negative electrode includes a mixture of one or more active materials (e.g., zinc), an electrically conductive material, solid zinc oxide, and/or, in some embodiments, a surfactant. The negative electrode can optionally include other additives, for example a binder or a gelling agent, and the like. The first electrode 18 may have generally uniform characteristics. For example, the anode may have an at least substantially uniform distribution of components therein. However, it should be understood that in certain embodiments, the anode may have non-uniform characteristics (e.g., a non-uniform distribution of anode components).

In certain embodiments, the amount of zinc present in the negative electrode ranges generally from about 62 to about 78 weight percent, (e.g., from about 64 to about 74 weight percent, and specifically about 68 to about 72 weight percent) based on the total weight of the negative electrode, i.e., zinc, solid zinc oxide, surfactant and gelled electrolyte. Zinc suitable for use in various embodiments may be purchased from a number of different commercial sources under various designations, such as BIA 100, BIA 115. Umicore, S. A., Brussels, Belgium is an example of a zinc supplier. In certain embodiments, the zinc powder generally has 25 to 40 percent fines less than 75 microns, and specifically 28 to 38 percent fines less than 75 microns. Generally lower percentages of fines will not allow desired high rate service to be realized and utilizing a higher percentage of fines can lead to increased gassing. A correct zinc alloy is needed in order to reduce negative electrode gassing in cells and to maintain test service results.

The solid zinc oxide added to the anode may have high purity and includes low levels of impurities that can result in higher zinc gassing and lowered service. The solid zinc oxide may contain less than 30 ppm iron, less than 3 ppm of silver and arsenic, less than 1 ppm of each of copper, nickel, chromium and cadmium, less than 0.50 ppm each of molybdenum, vanadium and antimony, less than 0.1 ppm tin and less than 0.05 ppm germanium.

In various embodiments, a surfactant added to the first electrode 18 may be either a nonionic or anionic surfactant, or a combination thereof. In certain embodiments, the surfactant is DISPERBYK-190 from BYK-Chemie GmbH of Wesel, Germany, although other surfactants may be utilized in various embodiments.

The aqueous alkaline electrolyte may comprise an alkaline metal hydroxide such as potassium hydroxide (KOH), sodium hydroxide, or the like, or mixtures thereof. The alkaline electrolyte used to form the gelled electrolyte of the negative electrode contains the alkaline metal hydroxide in an amount from about 26 to about 36 weight percent, desirably from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service.

A gelling agent may be utilized in the negative electrode as is well known in the art, such as a crosslinked polyacrylic acid, such as Carbopol® 940, which is available from Noveon, Inc. of Cleveland, Ohio, USA. Carboxymethylcellulose, polymethacrylamide and sodium polymethacrylate are examples of other gelling agents that are suitable for use in an alkaline electrolyte solution. Gelling agents are desirable in order to maintain a substantially uniform dispersion of zinc and solid zinc oxide particles in the negative electrode. The amount or gelling agent present may be chosen so that lower rates of electrolyte separation are obtained and anode viscosity in yield stress are not too great which can lead to problems with anode dispensing.

Other components which may be optionally present within one or more portions of the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide may be present via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 $m^2/g$ or less measured utilizing a Tristar 3000 BET specific surface area analyzer from Micrometrics having a multi-point calibration after the zinc oxide has been degassed for one hour at 150° C.; and a particle size D50 (mean diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

As mentioned herein, the first electrode 18 may be extruded into an interior opening formed within the second electrode 12 (and within the separator).

In one embodiment, the zinc and solid zinc oxide powders, and other optional powders other than the gelling agent, are combined and mixed. In certain embodiments, the zinc and solid zinc oxide powders may be mixed in separate batches corresponding to various portion of the anode. For example, first zinc and zinc oxide powders may be mixed to form a first batch and second zinc and zinc oxide powers may be mixed to form a second batch (e.g., comprising a zinc powder having a different average zinc particle size than the zinc powder of the first batch).

Afterwards, a surfactant may be introduced into the mixture containing the zinc and solid zinc oxide. A pre-gel comprising alkaline electrolyte, soluble zinc oxide and gelling agent, and optionally other liquid components, may be introduced to the surfactant, zinc and solid zinc oxide mixture(s) which are further mixed to obtain a substantially homogenous mixture before addition to the cell.

In a further embodiment, the solid zinc oxide is predispersed in a negative electrode pre-gel comprising the alkaline electrolyte, gelling agent, soluble zinc oxide and other desired liquids, and blended, such as for about 15 minutes. The solid zinc and surfactant are then added and the negative electrode composition is blended for an additional period of time, such as about 20 minutes. The amount of gelled electrolyte utilized in the negative electrode composition is generally from about 25 to about 35 weight percent. For example, the amount of gelled electrolyte may be about 32 weight percent based on the total weight of the negative electrode composition. Volume percent of the gelled electrolyte may, in certain embodiments, be about 70% based on the total volume of the negative electrode. In addition to the aqueous alkaline electrolyte absorbed by the gelling agent during the negative electrode manufacturing process, an additional quantity of an aqueous solution of alkaline metal hydroxide, i.e., "free electrolyte", may also be added to the cell during the manufacturing process. The free electrolyte may be incorporated into the cell by disposing it into the cavity defined by the positive electrode or negative electrode, or combinations thereof. In one embodiment, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is inserted.

Second electrode 12, also referred to herein as the positive electrode or cathode, may include manganese dioxide as the electrochemically active material. Manganese dioxide may be present in an amount generally from about 80 to about 86 weight percent, such as from about 81 to 85 weight percent by weight based on the total weight of the positive electrode, i.e., manganese dioxide, conductive material, positive electrode electrolyte and additives such as barium sulfate. Manganese dioxide is commercially available as natural manganese dioxide (NMD), chemical manganese dioxide (CMD), or electrolytic manganese dioxide (EMD). The preferred manganese dioxide for use in a cell is EMD. Suppliers of EMD include Tronox Ltd. of Stamford, Conn.; Tosoh Corporation of Tokyo, Japan, and Erachem Comilog, Inc. of Baltimore, Md. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed. Second electrode 12 has a ledge 30 and an interior surface 32 as illustrated in FIG. 1. Alternatively, the positive electrode may be formed by pre-forming a plurality of rings from the mixture comprising manganese dioxide and then inserting the rings into the container to form the tubular-shaped second electrode. The cell shown in FIG. 1 would typically include 3 or 4 rings.

The positive electrode can include other components such as a conductive material, for example graphite, that when mixed with the manganese dioxide provides an electrically conductive matrix substantially throughout the positive electrode. Conductive material can be natural, i.e., mined, or synthetic, i.e., manufactured. In one embodiment, the cells include a positive electrode having an active material or oxide to carbon ratio (O:C ratio) that ranges from about 12 to about 14. Too high of an oxide to carbon ratio decreases the container to cathode resistance, which affects the overall cell resistance and can have a potential effect on high rate tests, such as the DSC test, or higher cut-off voltages. Furthermore the graphite can be expanded or non-expanded. Suppliers of graphite for use in alkaline batteries include Imerys Graphite & Carbon in Bironico, Switzerland and Superior Graphite in Chicago, Ill. Conductive material may be present generally in an amount from about 5 to about 10 weight percent based on the total weight of the positive electrode. Too much graphite can reduce manganese dioxide input, and thus cell capacity; too little graphite can increase container to cathode contact resistance and/or bulk cathode resistance. An example of an additional additive is barium sulfate ($BaSO_4$), which is commercially available from Bario E. Derivati S.p.A. of Massa, Italy. The barium sulfate may be present in an amount generally from about 1 to about 2 weight percent based on the total weight of the positive electrode. Other additives can include, for example, barium acetate, titanium dioxide, binders such as coathylene, and calcium stearate.

In one embodiment, the positive electrode component, such as the manganese dioxide, conductive material, and barium sulfate are mixed together to form a homogeneous mixture. During the mixing process, an alkaline electrolyte solution, such as from about 37% to about 40% KOH solution, is evenly dispersed into the mixture thereby insuring a uniform distribution of the solution throughout the positive electrode materials. The mixture is then added to the container and molded utilizing a ram. Moisture within the container and positive electrode mix before and after molding, and components of the mix may be optimized to allow quality positive electrodes to be molded. Mix moisture optimization allows positive electrodes to be molded with minimal splash and flash due to wet mixes, as well as spalling and excessive tool wear due to dry mixes, with optimization helping to achieve a desired high cathode weight. Moisture content in the positive electrode mixture can affect the overall cell electrolyte balance and has an impact on high rate testing.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

By providing a characteristic gradient within the anode, the overall electrical capacity of the anode may remain substantially unchanged relative to traditional, homogenous anode formulations, however the portions of the anode known to discharge more quickly in high-rate discharge applications may be modified to increase the electrical capacity of the anode in those regions. Because the overall electrical capacity of the anode remains substantially unchanged relative to homogenous anode formulations, an anode defining a characteristic gradient theoretically has similar low-rate discharge performance similar to traditional homogenous anode formulations.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Although discussed herein specifically in reference to alkaline primary cells having a bobbin configuration, it should be understood that various embodiments may provide current interrupt configurations in other electrochemical cell types. For example, a current interrupt having a configuration as discussed herein may be utilized with other primary electrochemical cell types, with secondary electrochemical cell types, with other electrochemical cell types having a bobbin configuration, with electrochemical cell types utilizing a jellyroll configuration (or other configuration), and/or the like.

That which is claimed:

1. A electrochemical cell comprising:
   a container having a positive terminal and a negative terminal cover;
   a ring-shaped cathode positioned within the container and defining a hollow interior, wherein the cathode is in electrical connection with the positive terminal;
   an anode positioned within the hollow interior of the cathode;
   an anode conducting assembly electrically connecting the anode with the negative terminal cover, wherein the anode conducting assembly comprises:
   an anode current collector; and
   a current interrupt assembly secured to the anode current collector and electrically connecting the anode current collector with the negative terminal cover, wherein the current interrupt assembly comprises a thermoplastic pad having a conductive plating positioned between the anode current collector and the negative terminal cover; and
   a separator positioned between the cathode and the anode.

2. The electrochemical cell of claim 1, wherein the conductive plating has a thickness between about 1.5 microns and about 10 microns.

3. The electrochemical cell of claim 1, wherein the thermoplastic pad comprises a thermoplastic material having a glass transition temperature of less than 150° C.

4. The electrochemical cell of claim 1, wherein the thermoplastic pad comprises an ABS plastic.

5. The electrochemical cell of claim 1, wherein the conductive plating comprises at least one of: copper or tin.

6. A conducting assembly for an electrochemical cell, wherein the conducting assembly is configured for conducting current along a conductive path from an electrode to a terminal of the electrochemical cell, wherein the conducting assembly comprises:
   a current collector in contact with the electrode; and
   a current interrupt secured onto the current collector, wherein the current interrupt is configured for conducting current from the current collector to the terminal of the electrochemical cell, wherein the current interrupt comprises:
   a thermoplastic pad; and
   a conductive plating layer on an exterior surface of the thermoplastic, wherein the conductive plating layer defines at least a portion of the conductive path.

7. The conducting assembly of claim 6, wherein the thermoplastic pad comprises an ABS plastic.

8. The conducting assembly of claim 6, wherein the conductive plating layer comprises at least one of copper or tin.

9. A method of manufacturing a primary electrochemical battery, the method comprising:
   providing a battery container having a positive terminal and a negative terminal cover;
   disposing a cathode within the container, wherein the cathode is in electrical connection with the positive terminal, and wherein the cathode defines a hollow interior;
   disposing a separator along an interior wall of the hollow interior of the cathode;

filling the hollow interior of the cathode with an anode;
positioning an anode current collector within the anode; and
electrically connecting the anode current collector with the negative terminal cover via a current interrupt assembly secured to the anode current collector, wherein the current interrupt assembly comprises a thermoplastic pad having a conductive plating.

10. The method of claim 9, further comprising steps for forming the current interrupt assembly by:
providing a thermoplastic disk as a substrate; and
plating the thermoplastic disk with a conductor.

11. The method of claim 10, wherein the conductor comprises one of: copper or tin.

12. The electrochemical cell of claim 1, wherein the current interrupt assembly is in contact with a lower surface of the negative terminal cover and an upper end of the anode current collector.

13. The electrochemical cell of claim 1, wherein the conductive plating surrounds the thermoplastic pad.

14. The conducting assembly of claim 6, wherein the conductive plating layer surrounds the thermoplastic pad.

15. The conducting assembly of claim 6, wherein the current interrupt is in contact with an upper end of the current collector.

16. The method of claim 9, wherein electrically connecting the anode current collector with the negative terminal cover comprises placing the current interrupt assembly between an upper end of the anode current collector and a lower surface of the negative terminal cover.

17. The method of claim 9, wherein the conductive plating surrounds the thermoplastic pad.

\* \* \* \* \*

UNITED STATES PATENT AND TRADEMARK OFFICE
CERTIFICATE OF CORRECTION

PATENT NO. : 11,081,763 B2  
APPLICATION NO. : 16/413308  
DATED : August 3, 2021  
INVENTOR(S) : Marcaly Page 1 of 1

It is certified that error appears in the above-identified patent and that said Letters Patent is hereby corrected as shown below:

In the Claims

<u>Column 12,</u>
Line 51, "thermoplastic" should read --thermoplastic pad--.

Signed and Sealed this  
Fifth Day of July, 2022

Katherine Kelly Vidal  
*Director of the United States Patent and Trademark Office*